US012661870B2

(12) United States Patent
Fujita et al.

(10) Patent No.: US 12,661,870 B2
(45) Date of Patent: Jun. 23, 2026

(54) INPUT DEVICE COVER MEMBER AND INPUT DEVICE

(71) Applicant: NIPPON ELECTRIC GLASS CO., LTD., Otsu (JP)

(72) Inventors: Naoki Fujita, Otsu (JP); Takumi Kinoshita, Otsu (JP)

(73) Assignee: NIPPON ELECTRIC GLASS CO., LTD., Otsu (JP)

( * ) Notice: Subject to any disclaimer, the term of this patent is extended or adjusted under 35 U.S.C. 154(b) by 122 days.

(21) Appl. No.: 18/564,911

(22) PCT Filed: May 24, 2022

(86) PCT No.: PCT/JP2022/021245
§ 371 (c)(1),
(2) Date: Nov. 28, 2023

(87) PCT Pub. No.: WO2022/255163
PCT Pub. Date: Dec. 8, 2022

(65) Prior Publication Data
US 2024/0288959 A1 Aug. 29, 2024

(30) Foreign Application Priority Data
Jun. 1, 2021 (JP) ................................. 2021-092316

(51) Int. Cl.
*B32B 17/06* (2006.01)
(52) U.S. Cl.
CPC .......... *B32B 17/06* (2013.01); *B32B 2250/03* (2013.01); *B32B 2457/20* (2013.01)

(58) Field of Classification Search
CPC .. B32B 17/06; B32B 2250/03; B32B 2457/20
(Continued)

(56) References Cited

U.S. PATENT DOCUMENTS

| | | | |
|---|---|---|---|
| 11,036,314 B2 * | 6/2021 | Fujita ...................... | G06F 3/041 |
| 2009/0035523 A1 * | 2/2009 | Takayanagi ............. | C04B 41/85 |
| | | | 204/192.12 |

(Continued)

FOREIGN PATENT DOCUMENTS

| | | |
|---|---|---|
| JP | 2018020942 A | 2/2018 |
| JP | 2018116367 A | 7/2018 |

(Continued)

OTHER PUBLICATIONS

International Search Report for International Application No. PCT/JP2022/021245; Mailing Date, Aug. 9, 2022.

(Continued)

*Primary Examiner* — Betelhem Shewareged
(74) *Attorney, Agent, or Firm* — CANTOR COLBURN LLP

(57) ABSTRACT

To provide an input device cover member capable of realizing excellent writability in an input operation for an input device even when a member having a high friction coefficient such as an elastomer material is used for a pen tip and said input device. An input device cover member disposed on a front surface side of a display in an input device. At least one main surface of the input device cover member has an uneven shape, and a maximum profile valley depth Rv of roughness profile element is larger than a maximum profile peak height Rp of roughness profile element on the main surface having the uneven shape.

19 Claims, 1 Drawing Sheet

(58) Field of Classification Search
　　USPC .......................................................... 428/141
　　See application file for complete search history.

(56) References Cited

U.S. PATENT DOCUMENTS

| | | | | |
|---|---|---|---|---|
| 2013/0306995 | A1 * | 11/2013 | Park | H01L 21/4803 |
| | | | | 428/141 |
| 2017/0300114 | A1 * | 10/2017 | Matsuyuki | G06F 3/016 |
| 2020/0301521 | A1 * | 9/2020 | Fujita | G06F 3/041 |
| 2024/0288959 | A1 * | 8/2024 | Fujita | G06F 3/0393 |

FOREIGN PATENT DOCUMENTS

| | | | | |
|---|---|---|---|---|
| JP | 2018173955 A | 11/2018 | | |
| WO | 2015072297 A1 | 5/2015 | | |
| WO | WO-2019058889 A1 * | 3/2019 | ......... | G06F 3/03545 |
| WO | 2020009081 A1 | 1/2020 | | |

OTHER PUBLICATIONS

KIPO Notice of Submission of Opinion for corresponding KR Application No. 10-2023-7039963; issued Apr. 16, 2026.

* cited by examiner

INPUT DEVICE COVER MEMBER AND INPUT DEVICE

CROSS REFERENCE TO RELATED APPLICATIONS

This is the U.S. national stage of application No. PCT/JP2022/021245, filed on May 24, 2022. Priority under 35 U.S.C. § 119(a) and 35 U.S.C. § 365(b) is claimed from Japanese Application No. 2021-092316, filed Jun. 1, 2021, the disclosure of which is also incorporated herein by reference.

TECHNICAL FIELD

The present invention relates to an input device cover member and an input device.

BACKGROUND ART

Conventionally, there is a known pen input device that enables a user to perform input operations, for example, to handwrite characters, figures, and the like on a screen using an input pen.

In such a pen input device, a transparent cover member made of a glass substrate, or the like is disposed on a front surface side of a display such as a liquid crystal display, and various input operations can be performed by bringing an input pen into contact with the surface of the cover member and moving the input pen thereon.

Here, in a case where a glass substrate is used as a cover member for a pen input device, since the surface of the glass substrate is generally formed to be smooth with small uneven shape, when the input pen is moved while being brought into contact with the surface of the cover member (glass substrate), a problem that a pen tip of the input pen slips and the writability becomes poor.

Therefore, using a pen tip made of an elastomer material having a high friction coefficient in order to prevent the slipperiness of the input pen, is disclosed in Patent Literature 1.

In addition, Patent Literature 2 discloses a cover glass (cover member) in which fine uneven shape are formed on a glass surface through an etching process to increase a frictional force, thereby improving the writability.

CITATIONS LIST

Patent Literature

Patent Literature 1: JP-A 2018-173955 Gazette
Patent Literature 2: WO 2015/072297 A1 Gazette

SUMMARY OF INVENTION

Technical Problems

However, in the case of using a pen tip made of an elastomer material as described in Patent Literature 1, the writability is improved as the pen tip has the flexibility, but since the elastomer material has a large adhesion force with respect to the cover member, the pen tip becomes too difficult to slip, and when the input pen is moved while being brought into contact with the surface of the cover member, the writability may rather deteriorate on the contrary.

In addition, even in a case where a pen tip made of an elastomer material having a large adhesion force is used for the cover glass described in Patent Literature 2, when the input pen is moved while being repeatedly brought into contact with the surface of the cover glass, a frictional force between the pen tip and the cover glass becomes too high, and favorable writability may not be obtained.

The present invention has been made in view of the current problems mentioned above, and aims to provide an input device cover member capable of realizing excellent writability in an input operation for an input device even when a member having a high friction coefficient such as an elastomer material is used for a pen tip, and said input device.

Solutions to Problems

The input device cover member and the input device that solve the above problem have the following features.

That is, the input device cover member according to the present invention is an input device cover member disposed on a front surface side of a display in an input device, wherein at least one main surface of the input device cover member has an uneven shape, and a maximum profile valley depth Rv of roughness profile element is larger than a maximum profile peak height Rp of roughness profile element on the main surface having the uneven shape.

With such a configuration, according to the input device cover member according to the present invention, since a deep valley exists in the uneven shape on the main surface, a contact area with respect to the pen tip is reduced to suppress an excessive increase in a frictional force between the main surface and the pen tip, whereby excellent writability can be realized in the input operation for the input device.

In the input device cover member according to the present invention, Sv/Sa, which is a ratio between a maximum pit height Sv and an arithmetical mean height Sa, on the main surface having the uneven shape is preferably 6 or more.

With such a configuration, according to the input device cover member according to the present invention, an excessive increase in a frictional force between the main surface and the pen tip is suppressed, whereby excellent writability can be realized in the input operation for the input device.

Furthermore, in the input device cover member according to the present invention, Sv/Sa, which is a ratio between a maximum pit height Sv and an arithmetical mean height Sa, on the main surface having the uneven shape is preferably 15 or more.

With such a configuration, according to the input device cover member according to the present invention, an excessive increase in a frictional force between the main surface and the pen tip is further suppressed, whereby further excellent writability can be realized in the input operation for the input device.

Besides, in the input device cover member according to the present invention, Rv/RSm, which is a ratio between a maximum profile valley depth Rv of roughness profile element and a mean width RSm of roughness profile element, on the main surface having the uneven shape is preferably 0.001 or more and 0.1 or less.

With such a configuration, according to the input device cover member according to the present invention, the pen tip can be made easy to slip, to a moderate degree, with respect to the main surface, whereby excellent writability can be realized in the input operation for the input device.

Furthermore, in the input device cover member according to the present invention, the arithmetical mean height Sa on the main surface having the uneven shape is preferably 1 nm or more and 50 nm or less.

With such a configuration, according to the input device cover member according to the present invention, it is possible to suppress the pen tip, to a moderate degree, from slipping on the main surface, as well as to reduce, to a moderate degree, a resistance to slipping of the pen tip on the main surface, whereby the writability of the input pen can be made excellent in an input operation for the input device.

The input device according to the present invention includes: either one of the input device cover members described above: a display: and a detection circuit for detecting a pen input.

Besides, the input device according to the present invention further includes an input pen for performing the pen input to the input device by moving while making contact with a main surface of the input device cover member.

With such a configuration, according to the input device according to the present invention, excellent writability can be realized in the input operation for the input device with the input pen.

Advantageous Effects of Invention

According to the present invention, excellent writability can be realized in an input operation for the input device.

DESCRIPTION OF EMBODIMENT

Figures 1, 2:
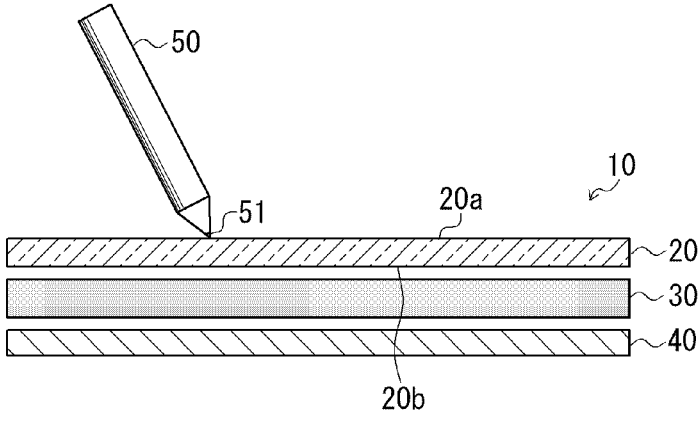
FIG. 1 is a schematic lateral-side cross-section view illustrating an input device.
FIG. 2 is a view showing a measured cross-section curve on a main surface of a cover member.

Next, a mode for implementing an input device cover member and an input device according to the present invention will be described with reference to the accompanying drawings.

[Overall Configuration of Pen Input Device 10]

First, the overall configuration of an input device 10 will be described with reference to FIG. 1.

The input device 10 is one embodiment of an input device provided with the input device cover member according to the present invention.

The input device 10 includes a display element 30 that is one example of a display for displaying a video, a glass substrate 20 as a cover member disposed on a front surface side of the display element 30, a digitizer circuit 40 disposed on a back surface side of the display element 30, an input pen 50, and the like.

The glass substrate 20 is one example of the input device cover member according to the present invention, and the digitizer circuit 40 is one example of the detection circuit for detecting input according to the present invention.

Note that, in the above description, the "front surface side" of the display element 30 denotes a side on which a video is displayed, and the "back surface side" of the display element 30 denotes a side opposite to the side on which a video is displayed.

In the present embodiment, for example, the "front surface side" of the display element 30 is the upper side of the paper surface in FIG. 1, and the "rear surface side" of the display element 30 is the lower side of the paper surface in FIG. 1.

The input device 10 is configured to be able to input characters, figures, and the like through pen input (input operation) on a main surface 20a (a surface opposite to the display element 30 side with respect to the glass substrate 20) of the glass substrate 20 by moving the input pen 50 in a state of being brought into contact therewith. Examples of the input device 10 include a tablet terminal.

Here, the tablet terminal broadly means pen input display devices each having both a display function and a pen input function, and includes devices such as a tablet PC, a mobile PC, a smartphone, and a game console.

The glass substrate 20 is formed of a transparent glass plate having an uneven shape formed on at least one main surface (the main surface 20a described above in the present embodiment).

In addition, the glass substrate 20 is disposed such that the main surface 20a having an uneven shape formed thereon is a surface on a side with which the input pen 50 comes into contact.

Here, as the glass substrate 20, it is possible to use, for example, a glass plate made of aluminosilicate glass, boro-silicate glass, or the like.

In addition, when the glass substrate 20 is configured by a glass plate made of alkali-containing aluminosilicate glass, the glass substrate 20 may have a chemically strengthened layer on the surface thereof.

Note that details of the glass substrate 20 will be described later.

The digitizer circuit 40 includes a detection sensor for detecting an input operation by the input pen 50.

The input pen 50 is an input instrument having a shape similar to that of a writing instrument such as a pencil or a ballpoint pen, and has a pen tip 51 that is one example of a friction element coming into contact with the glass substrate 20, and the pen tip 51 is configured of a synthetic resin material such as an elastomer or a polyacetal resin, or felt.

The input pen 50 having the pen tip 51 formed of the abovementioned member is easily caught in fine uneven shape.

Therefore, particularly, when the pen tip 51 of the input pen 50 is moved while being in contact with the main surface 20a of the glass substrate 20 having an uneven shape formed thereon, excellent writability can be realized.

Note that, in the present embodiment, the glass substrate 20 is used as the input device cover member, but the cover member is not limited thereto. For example, a resin substrate formed of a synthetic resin and having an uneven shape formed on at least one main surface can be used as the input device cover member.

In this case, the uneven shape of the resin substrate can be formed by, for example, performing blasting such as wet blasting on the main surface of the resin substrate, or embossing on the main surface of the resin substrate.

In addition, it is also possible to use, as the input device cover member, one obtained by laminating a resin layer having an uneven shape formed on the surface thereof, on at least one main surface of a glass substrate.

In this case, the cover member can be formed by bonding a resin sheet having an uneven shape formed on the surface thereof to the main surface of the glass substrate.

The uneven shape of the resin sheet can be formed by, for example, performing embossing on the surface of the resin sheet or forming a synthetic resin mixed with particulate objects into a sheet shape.

The resin layer can also be formed by spraying a synthetic resin onto the main surface of the glass substrate.

However, in a case where the glass substrate 20 is used as the input device cover member, the hardness of the surface (particularly, a main surface coming into contact with the pen tip 51 of the input pen 50) increases as compared with a case where the resin substrate or a substrate having a resin layer formed on the main surface of the glass substrate, or the like is used, the glass substrate 20 is advantageous in that the surface thereof is hardly scratched.

[Configuration of Glass Substrate 20]

Next, the configuration of the glass substrate 20 will be described in detail with reference to FIG. 1 and FIG. 2.

As described above, the glass substrate 20 is one embodiment of the input device cover member according to the present invention. In FIG. 1, an uneven shape is formed on the main surface 20a of the glass substrate 20.

As illustrated in FIG. 2, the uneven shape formed on the main surface 20a of the glass substrate 20 is configured by fine uneven shape having deep valleys irregularly.

In the fine uneven shape of the main surface 20a, the maximum profile valley depth Rv of roughness profile element is larger than the maximum profile peak height Rp of roughness profile element (Rp<Rv). In addition, the arithmetical mean height Sa of the fine uneven shape on the main surface 20a is 1 nm or more and 50 nm or less.

Furthermore, in the fine uneven shape on the main surface 20a, Sv/Sa, which is a ratio between the maximum pit height Sv and the arithmetical mean height Sa, is 6 or more (Sv/Sa≥6). In this case, Sv/Sa, which is a ratio between the maximum pit height Sv and the arithmetical mean height Sa, is preferably 15 or more (Sv/Sa≥15).

In the fine uneven shape on the main surface 20a, Rv/RSm, which is a ratio between the maximum profile valley depth Rv of roughness profile element and the mean width RSm of roughness profile element, is 0.001 or more and 0.1 or less (0.001≤Rv/RSm≤0.1).

Here, the maximum profile valley depth Rv, the maximum profile peak height Rp, and the mean width RSm of roughness profile element in the present application conform to JIS B0601 2013, and the arithmetical mean height Sa and the maximum pit height Sv conform to ISO 25178.

In the fine uneven shape on the main surface 20a, the arithmetical mean height Sa is an average of absolute values of peak heights Za and valley depths Zb in the uneven shape on a predetermined surface $(Sa=((|Za_1|+|Za_2|+ \ldots +|Za_n|)+ (|Zb_1|+|Zb_2|+ \ldots +|Zb_n|))/2n)$. The maximum pit height Sv is the deepest valley Sv in the fine uneven shape on the predetermined surface.

The maximum profile peak height Rp in the fine uneven shape is the height Rp of the highest peak in the fine uneven shape at a predetermined reference length, and the maximum profile valley depth Rv in the fine uneven shape is the depth Rv of the deepest valley in the fine uneven shape at the predetermined reference length. The sum of the maximum profile peak height Rp and the maximum profile valley depth Rv at a predetermined specified length is the maximum height Rz (Rz=Rp+Rv). Furthermore, the mean width RSm of roughness profile element in the fine uneven shape is an average of cycle lengths X of the fine uneven shape at the predetermined reference length $(RSm=(X_1+X_2+ \ldots +X_n)/n)$.

The values of the arithmetical mean height Sa, the maximum pit height Sv, the maximum height Rz of the roughness curve element, the mean width RSm of roughness profile element, the maximum profile peak height Rp of roughness profile element, and the maximum profile valley depth Rv of roughness profile element in the fine uneven shape are values evaluated from a roughness curve obtained when a cutoff value λc1 of a high-pass filter λc for blocking long-wavelength components from a measured cross-section curve on the main surface 20a is set to 14 μm and a cutoff value λs1 of a low-pass filter λs for blocking short-wavelength components from the measured cross-section curve on the main surface 20a is set to 0.35 μm.

That is, when the cutoff value λc1 of the high-pass filter λc is 14 μm and the cutoff value λs1 of the low-pass filter λs is 0.35 μm, the uneven shape formed on the main surface 20a of the glass substrate 20 is expressed as fine uneven shape having a relation of Rp<Rv between the maximum profile valley depth Rv and the maximum profile peak height Rp, expressed as fine uneven shape having an arithmetical mean height Sa of 1 nm or more and 50 nm or less, expressed as fine uneven shape having a ratio Sv/Sa, which is a ratio between the maximum pit height Sv and the arithmetical mean height Sa, of 6 or more, and expressed as fine uneven shape having a ratio Rv/RSm, which is a ratio between the maximum profile valley depth Rv of roughness profile element and the mean width RSm of roughness profile element, of 0.001 or more and 0.1 or less.

As described, the uneven shape formed on the main surface 20a of the glass substrate 20 is configured by fine uneven shape having deep valleys irregularly.

In the input device 10 (see FIG. 1) according to the present embodiment, since the shapes of the fine uneven shape on the main surface 20a of the glass substrate 20 are respectively formed within the ranges under the above-described conditions, it is possible to improve the writability of the input pen 50 while maintaining the visibility of the display element 30 (see also FIG. 1).

In addition, by forming the fine uneven shape into an uneven shape configured within the ranges under the above-described conditions, it is possible to suppress an occurrence of glare called sparking due to interference of scattered light caused by the uneven shape.

Furthermore, in the present embodiment, since no resin layer is formed on the main surface 20a of the glass substrate 20 and an uneven shape is directly formed on the main surface 20a, the glass substrate 20 has high scratch resistance and hardly scratched, whereby the visibility of the display element 30 does not deteriorate.

The fine uneven shape contributes to a frictional force between the main surface 20a of the glass substrate 20 and the pen tip 51 of the input pen 50. The contribution of the frictional force varies depending on the material of the pen tip 51.

Specifically, in the case of the pen tip 51 made of elastomer which is a material having a low elastic modulus, the flatter the main surface 20a of the glass substrate 20 is, the larger a frictional force generated due to an adhesion force becomes, whereby the pen tip 51 is less likely to slip with respect to the main surface 20a of the glass substrate 20.

In this case, by providing fine uneven shape to the main surface 20a of the glass substrate 20, it is possible to reduce an area of contact between the main surface 20a and the pen tip 51 of the input pen 50, whereby the pen tip 51 can be made easy to slip, to a moderate degree, with respect to the main surface 20a of the glass substrate 20.

On the other hand, in the case of the pen tip 51 made of a hard material such as POM, the flatter the main surface 20a of the glass substrate 20 is, the lower a frictional force becomes, whereby the pen tip 51 becomes easy to slip with respect to the main surface 20a of the glass substrate 20.

Regarding this, by providing fine uneven shape to the main surface 20a of the glass substrate 20, the pen tip 51 of the input pen 50 is easily caught by the main surface 20a. As a result, a frictional force between the main surface 20a and the pen tip 51 increases, whereby the pen tip 51 becomes less likely to slip, to a moderate degree, with respect to the main surface 20a of the glass substrate 20.

In the case of the pen tip 51 made of a material such as felt, the pen tip 51 exhibits a behavior similar to that of the pen tip 51 made of POM described above, and by providing fine uneven shape to the main surface 20a of the glass substrate 20, the pen tip 51 of the input pen 50 is easily caught by the main surface 20a. As a result, a frictional force between the main surface 20a and the pen tip 51 increases, whereby the pen tip 51 becomes less likely to slip, to a moderate degree, with respect to the main surface 20a of the glass substrate 20.

In this way, by providing fine uneven shape to the main surface 20a of the glass substrate 20, in the case of the pen tip 51 of the input pen 50 made of various materials (elastomer, POM, and felt), it is possible to suppress the pen tip 51, to a moderate degree, from slipping on the main surface 20a, or to reduce, to a moderate degree, a resistance to slipping of the pen tip 51 on the main surface 20a. Accordingly, the writability of the input pen 50 can be made excellent in an input operation for the input device 10.

In particular, by providing fine uneven shape having an arithmetical mean height Sa of 1 nm or more and 50 nm or less to the main surface 20a of the glass substrate 20, it is possible to suppress the pen tip 51, to a moderate degree, from slipping on the main surface 20a, as well as to reduce, to a moderate degree, a resistance to slipping of the pen tip 51 on the main surface 20a, whereby the writability of the input pen 50 can be made excellent in an input operation for the input device 10.

Here, as described above, in the present embodiment, an upper limit value of the arithmetical mean height Sa of the fine uneven shape is set to 50 nm. However, the upper limit value is preferably set to 40 nm, more preferably set to 30 nm, particularly preferably set to 20 nm, and most preferably set to 15 nm.

As described above, in the present embodiment, the fine uneven shape on the main surface 20a have deep valleys, and the maximum profile valley depth Rv and the maximum profile peak height Rp have a relation of Rp<Rv. The pen tip 51 is caught by crest portions of the fine uneven shape on the main surface 20a, thereby contributing to an increase in a frictional force. On the other hand, valleys in the fine uneven shape on the main surface 20a do not come into contact with the pen tip 51, that is, contribute to a reduction in contact area. The fine uneven shape having irregularly deep valleys have a surface shape as illustrated in FIG. 2, and the presence of the deep valleys decreases an area of contact with the pen tip 51, and as a result, it is possible to suppress an excessive increase of a frictional force. In particular, the pen tip 51 made of elastomer having a strong adhesion force contributes to a reduction in frictional force, whereby the pen tip 51 slips smoothly. Accordingly, excellent writability can be realized in an input operation for the input device 10.

Here, as described above, in the present embodiment, the maximum profile valley depth Rv and the maximum profile peak height Rp have a relation of Rp<Rv, but preferably have a relation of Rv−Ra≥0.5, more preferably have a relation of Rv−Ra≥1, particularly preferably have a relation of Rv−Ra≥2, and most preferably have a relation of Rv−Ra≥3.

Furthermore, as described above, in the present embodiment, Sv/Sa, which is a ratio between the maximum pit height Sv and the arithmetical mean height Sa, is set to be 6 or more. However, Sv/Sa is preferably set to be 8 or more, more preferably set to be 10 or more, further preferably set to be 12 or more, and particularly preferably set to be 15 or more.

When Sv/Sa, which is a ratio between the maximum pit height Sv and the arithmetical mean height Sa, is 6 or more, it is an indicator that the surface with the fine uneven shape has deep valleys. Therefore, when Sv/Sa, which is a ratio between the maximum pit height Sv and the arithmetical mean height Sa, is 6 or more, an excessive increase in frictional force between the main surface 20a and the pen tip 51 is suppressed, whereby excellent writability can be realized in an input operation for the input device 10. Particularly, when Sv/Sa, which is a ratio between the maximum pit height Sv and the arithmetical mean height Sa, is 15 or more, an excessive increase in frictional force between the main surface 20a and the pen tip 51 is further suppressed, whereby further excellent writability can be realized in an input operation for the input device 10.

Rv/RSm, which is a ratio between the mean width RSm of roughness profile element and the maximum profile valley depth Rv of roughness profile element in the fine uneven shape, is a value corresponding to a virtual aspect ratio in the valleys in the fine uneven shape formed on the main surface 20a of the glass substrate 20.

Specifically, when a value of Rv/RSm, which is a ratio between the mean width RSm of roughness profile element and the maximum profile valley depth Rv of roughness profile element, is large, the valleys become deep. As the valleys in the fine uneven shape become deep, in the case of the pen tip 51 made of elastomer which is a material having a large adhesion force, it is possible to reduce an area of contact with the main surface 20a of the glass substrate 20, whereby a frictional force between the main surface 20a and the pen tip 51 decreases, and the pen tip 51 can be made easily shippable, to a moderate degree, with respect to the main surface 20a. Accordingly, excellent writability can be realized in an input operation for the input device 10.

Furthermore, when the valleys in the fine uneven shape become deep, in the case of the pen tip 51 made of a hard material such as POM, it is possible to suppress an increase in frictional force caused by the pen tip 51 having being caught excessively by the fine uneven shape on the main surface 20a, whereby the pen tip 51 can be made easily shippable, to a moderate degree, with respect to the main surface 20a. Accordingly, excellent writability can be realized in an input operation for the input device 10.

As described above, in the present embodiment, a lower limit value of Rv/RSm, which is a ratio between the mean width RSm of roughness profile element and the maximum profile valley depth Rv of roughness profile element, is set to 0.001. However, the lower limit value is preferably set to 0.002 and more preferably set to 0.003.

On the other hand, if a value of Rv/RSm, which is a ratio between the mean width RSm of roughness profile element and the maximum profile valley depth Rv of roughness profile element, is too large, the valleys of the fine uneven shape partially have too sharp shape and easily bite into the pen tip 51 that is a friction element, so that an excessive frictional force is generated between the main surface 20a and the pen tip 51, whereby the writability deteriorates.

Therefore, in the present embodiment, an upper limit value of Rv/RSm, which is a ratio between the mean width RSm of roughness profile element and the maximum profile valley depth Rv of roughness profile element in the fine uneven shape, is set to 0.1. However, the upper limit value is preferably set to 0.09, more preferably set to 0.08, further preferably set to 0.06, and particularly preferably set to 0.04.

In addition, the main surface 20a of the glass substrate 20 is particularly excellent in the writability with respect to the pen tip 51 made of a material capable of adjusting a frictional force against the uneven shape, such as the above-described synthetic resin material including elastomer and POM, felt, and a composite material of felt and a synthetic resin material.

In FIG. 1, in the glass substrate 20, from the viewpoint of visibility of a video on the display element 30 when being viewed through the glass substrate 20, the haze representing the opacity by an index related to the transparency is preferably less than 10% in a visible light wavelength range (380 nm to 780 nm).

By setting the haze of the glass substrate 20 to less than 10%, it is possible to maintain the degree of transparency of the glass substrate 20, and maintain the visibility of the display element 30.

Furthermore, it is possible to form, on the main surface 20a of the glass substrate 20, an antireflection film for reducing the reflectance on the side with which the input pen 50 comes into contact, or an antifouling film for preventing the adhesion of a fingerprint and imparting the water repellency and the oil repellency.

When the glass substrate 20 is used as a cover member for the input device 10, the antireflection film is formed at least on the main surface 20a on the front side (the side with which the input pen 50 comes into contact) of the glass substrate 20. In addition, when there is a gap between the glass substrate 20 and the display element 30, it is preferable that an antireflection film is also provided on a main surface 20b on the back side (the display element 30 side) of the glass substrate 20.

As the antireflection film, for example, a low refractive index film having a refractive index lower than that of the glass substrate 20, or a dielectric multilayer film in which a low refractive index film having a relatively low refractive index and a high refractive index film having a relatively high refractive index are alternately laminated, is used. The antireflection film can be formed through a sputtering method, a CVD method, or the like.

When the antireflection film is formed on the main surface 20a of the glass substrate 20, the uneven shape on the main surface 20a of the glass substrate 20 is formed such that the uneven shape on the surface of the antireflection film fall within the above-mentioned surface roughness range (values of the arithmetical mean height Sa, the maximum pit height Sv, the maximum height Rz of the roughness curve element, the mean width RSm of roughness profile element, the maximum profile peak height Rp of roughness profile element, and the maximum profile valley depth Rv of roughness profile element in the fine uneven shape).

When the antireflection film is formed on the main surface 20a of the glass substrate 20, the uneven shape on the main surface 20a of the glass substrate 20 is formed such that the haze of the glass substrate 20 having the antireflection film falls within the above-described range.

Note that, in the case of measuring the arithmetical mean height Sa, the maximum pit height Sv, the maximum height Rz of the roughness curve element, the mean width RSm of roughness profile element, the maximum profile peak height Rp of roughness profile element, and the maximum profile valley depth Rv of roughness profile element in the fine uneven shape after the formation of the antireflection film, a 10-nm Au film is formed and then these values are measured.

When the glass substrate 20 is used as a cover member for the input device 10, the antifouling film is formed on the main surface 20a on the front side (the side with which the input pen 50 comes into contact) of the glass substrate 20. In addition, the antifouling film preferably contains a fluorine-containing polymer containing silicon in a main chain.

As the fluorine-containing polymer, for example, a polymer having a —Si—O—Si-unit in the main chain and having a water-repellent functional group containing fluorine in a side chain can be used. The fluorine-containing polymer can be synthesized, for example, through the dehydration condensation of silanol.

When the antireflection film and the antifouling film are formed on the main surface 20a on the front side of the glass substrate 20, the antireflection film is formed on the main surface 20a of the glass substrate 20, and then the antifouling film is formed on the antireflection film.

When the antifouling film is formed on the main surface 20a of the glass substrate 20, or when the antireflection film and the antifouling film are formed on the main surface 20a of the glass substrate 20, the uneven shape on the main surface 20a of the glass substrate 20 is formed such that the uneven shape on the surface of the antifouling film fall within the above-mentioned surface roughness range (the arithmetical mean height Sa, the maximum pit height Sv, the maximum height Rz of the roughness curve element, the mean width RSm of roughness profile element, the maximum profile peak height Rp of roughness profile element, and the maximum profile valley depth Rv of roughness profile element in the fine uneven shape).

When the antifouling film is formed on the main surface 20a of the glass substrate 20, or when the antireflection film and the antifouling film are formed on the main surface 20a of the glass substrate 20, the uneven shape on the main surface 20a of the glass substrate 20 is formed such that the haze of the glass substrate 20 having the antifouling film formed thereon, or the haze of the glass substrate 20 having the antireflection film and the antifouling film formed thereon, falls within the above-described range.

In the case of forming a chemically-reinforced layer on the surface of the glass substrate 20, the glass substrate 20 is subjected to a chemical reinforcement process.

The chemical reinforcement process is a generic term for a technique in which a glass substrate is immersed in molten salt containing an alkali metal, and an alkali metal (ion) having a small atomic diameter present on the outermost surface of the glass substrate is replaced with an alkali metal (ion) having a large atomic diameter present in the molten salt. On the surface of the glass substrate subjected to the chemical reinforcement process, atoms of an alkali metal (ion) having an atomic diameter larger than that of the original atoms before the process are disposed. For example, when the glass substrate contains sodium (Na), this sodium is replaced by, for example, potassium (K) in molten salt (e.g. nitrate) during the chemical reinforcement process. Therefore, a compressive stress layer can be formed on the surface of the glass substrate, thereby improving the strength of the glass substrate.

Accordingly, by performing the chemical reinforcement process on the glass substrate 20, the durability of the pen input device 10 itself can be improved, and the scratch resistance of the glass substrate 20 as the cover member can be improved.

11

[Method for Manufacturing the Glass Substrate 20]

Next, a method for manufacturing the glass substrate 20 will be described with reference to FIG. 1.

The uneven shape formed on at least one main surface 20a of the glass substrate 20 are formed by performing at least one or more processing methods such as a sand blasting process and a wet blasting process in combination on the main surface 20a.

The sand blasting process is a process of forming fine uneven shape on a workpiece made of glass, by injecting individual particles such as alumina from an injection nozzle to the workpiece at high speed using compressed air. On the other hand, the wet blasting process is a process of forming fine uneven shape on a workpiece made of glass, by injecting a slurry obtained by uniformly stirring abrasive grains configured by individual particles such as alumina and a liquid such as water, from an injection nozzle to the workpiece at high speed using compressed air.

12 high speed, corner portions of the abrasive grains stick into the workpiece, and as a result, deep valley portions are formed in the workpiece.

EXAMPLES

Next, an example of the glass substrate 20 in which an uneven shape is formed on one main surface 20a through the sand blasting process and the wet blasting process, will be described.

Note that the configuration of the glass substrate 20 is not limited to that described below.

[Preparation of Samples]

In the present examples, as shown in Table 1, samples 1 to 13 were prepared as examples of the glass substrate 20, and samples 14 to 18 were prepared as comparative examples for these examples. Note that, as the glass substrate 20 used for each of these samples 1 to 18, an alkali-containing aluminosilicate glass having a thickness of 0.55 mm was used.

TABLE 1

| | | Formation of uneven shape | | | | |
|---|---|---|---|---|---|---|
| | | Processing method | Abrasive grain size | Processing time [minute] | Processing pressure [Mpa] | Nozzle scanning rate [nm/s] |
| Examples | Sample 1 | Sand blasting | #8000 | Approximately 3 | 0.2 | — |
| | Sample 2 | Sand blasting | #8000 | Approximately 6 | 0.2 | — |
| | Sample 3 | Sand blasting | #8000 | Approximately 6 | 0.3 | — |
| | Sample 4 | Sand blasting | #8000 | Approximately 4.5 | 0.4 | — |
| | Sample 5 | Sand blasting | #8000 | Approximately 6 | 0.4 | — |
| | Sample 6 | Sand blasting | #3000 | Approximately 3 | 0.4 | — |
| | Sample 7 | Sand blasting | #4000 | Approximately 3 | 0.4 | — |
| | Sample 8 | Sand blasting | #6000 | Approximately 6 | 0.4 | — |
| | Sample 9 | Sand blasting | #8000 | Approximately 6 | 0.4 | — |
| | Sample 10 | Wet blasting | #8000 | — | 0.2 | 0.5 |
| | Sample 11 | Wet blasting | #8000 | — | 0.2 | 10 |
| | Sample 12 | Wet blasting | #8000 | — | 0.2 | 1 |
| | Sample 13 | Wet blasting | #8000 | — | 0.2 | 5 |
| Comparative examples | Sample 14 | — | — | — | — | — |
| | Sample 15 | SiO$_2$ film | — | — | — | — |
| | Sample 16 | Etching | — | Approximately 17 | — | — |
| | Sample 17 | Etching | — | Approximately 33 | — | — |
| | Sample 18 | Etching | — | 50 | — | — |

In both of the sand blasting process and the wet blasting process, when the abrasive grains injected at a high speed collide with the workpiece, the abrasive grains in the slurry shave, strike, or rub the surface of the workpiece, whereby fine uneven shape are formed on the surface of the workpiece.

In this case, the size of the abrasive grains injected to the workpiece is important, and for example, fine uneven shape can be formed by using fine abrasive grains such as #4000, #6000, and #8000.

The surface roughness (the arithmetical mean height Sa, the maximum pit height Sv, the maximum height Rz of the roughness curve element, the mean width RSm of roughness profile element, the maximum profile peak height Rp of roughness profile element, and the maximum profile valley depth Rv of roughness profile element) in the fine uneven shape formed on the main surface of the workpiece through the sand blasting process and the wet blasting process, can be adjusted mainly based on the particle size distribution of the abrasive grains to be injected and the injection pressure when the slurry is injected to the workpiece.

In the sand blasting process and the wet blasting process, since the abrasive grains are injected to the workpiece at The glass substrate 20 in each of samples 1 to 9 serving as examples was subjected to the sand blasting process to form an uneven shape on one main surface 20a.

Specifically, the glass substrate 20 in each of samples 1 to 9 was subjected to the sand blasting process with alumina abrasive grains having a particle size of #3000, #4000, #6000, or #8000 under the conditions where the pressure of air is 0.2 to 0.4 Mpa and the processing time is approximately 3 to 6 minutes, thereby forming an uneven shape including fine uneven shape on one main surface 20a.

The glass substrate 20 in each of samples 10 to 13 serving as examples was subjected to the wet blasting process to form an uneven shape on one main surface 20a.

Specifically, the glass substrate 20 in each of samples 10 to 13 was subjected to the wet blasting process with alumina abrasive grains having a particle size of #8000 under the conditions where the pressure of air is 0.2 Mpa and the nozzle scanning rate is 0.5 to 10 mm/s, thereby forming an uneven shape including fine uneven shape on one main surface 20a.

In the wet blasting treatment, respective glass substrates 20 in samples 10 to 13 were disposed in a substantially vertical posture, 3 wt % of abrasive grains made of alumina having a particle size of #8000, water, and a dispersant were uniformly stirred to prepare a slurry, and the prepared slurry was injected from a round nozzle using air having a processing pressure of 0.2 MPa, while the round nozzle was moved at a speed of 0.5 to 10 mm/s to scan the entire of one main surface 20a of each glass substrate 20 to perform wet blasting.

The reason why the respective glass substrates 20 were disposed in a substantially vertical posture is to prevent the slurry sprayed entirely onto the main surface 20a from remaining in a limited area.

No process is performed on one main surface 20a in the glass substrate 20 in sample 14 serving as a comparative example. That is, the glass substrate 20 in sample 14 is unprocessed.

In the glass substrate 20 in sample 15 serving as a comparative example, a liquid containing a $SiO_2$ component was injected and applied to one main surface 20a, and the applied liquid containing $SiO_2$ component was dried to form a $SiO_2$ coating film on the main surface 20a. That is, the $SiO_2$ coating was performed on the glass substrate 20 in sample 15.

The glass substrate 20 in each of samples 16 to 18 serving as comparative examples was prepared by immersing each

14 profile element, and the maximum profile valley depth Rv of roughness profile element, and the measurement of the surface roughness was performed using a white-light interference microscope. The white-light interference microscope used was a white-light interference microscope (product name: New View 7300) manufactured by Zygo Corporation.

As the measurement conditions, an objective lens having a magnification of 50× and a zoom lens having a magnification of 2× were used, and the pixel number of a camera was set to 640×480 and the cumulative number was set to 10 with respect to a region of a measurement area of 74×55 μm.

When the arithmetical mean height Sa, the maximum pit height Sv, the mean width RSm of roughness profile element, the maximum profile peak height Rp of roughness profile element, and the maximum profile valley depth Rv of roughness profile element were measured, the cutoff value λc1 of the high-pass filter λc was set to 14 μm, and the cutoff value λs1 of the low-pass filter λs was set to 0.35 μm.

[Results of Surface Roughness Measurement]

Results of the surface roughness measurement performed on samples 1 to 18 will be described.

Table 2 shows the measurement results.

TABLE 2

| | | Surface properties | | | | | | | |
|---|---|---|---|---|---|---|---|---|---|
| | | Sa [nm] | Sv [nm] | RSm [nm] | Rp [nm] | Rv [nm] | Sv/Sa | Rv/RSm | Writability evaluation |
| Examples | Sample 1 | 1.4 | 55.4 | 2.2 | 5.6 | 9.4 | 39.0 | 0.0043 | ◎ |
| | Sample 2 | 2.6 | 42.1 | 2.1 | 9.4 | 15.6 | 15.9 | 0.0073 | ◎ |
| | Sample 3 | 3.5 | 85.1 | 2.1 | 11.8 | 19.4 | 24.6 | 0.0092 | ◎ |
| | Sample 4 | 5.0 | 80.0 | 2.3 | 15.5 | 25.5 | 16.0 | 0.0110 | ◎ |
| | Sample 5 | 4.6 | 87.8 | 2.2 | 16.0 | 23.4 | 19.0 | 0.0106 | ◎ |
| | Sample 6 | 10.0 | 204.3 | 2.5 | 34.2 | 57.5 | 20.4 | 0.0229 | ◎ |
| | Sample 7 | 6.8 | 114.3 | 2.6 | 17.1 | 51.3 | 16.9 | 0.0197 | ◎ |
| | Sample 8 | 3.5 | 65.7 | 2.3 | 11.2 | 31.0 | 18.6 | 0.0137 | ◎ |
| | Sample 9 | 2.2 | 52.4 | 2.4 | 5.8 | 15.8 | 23.4 | 0.0066 | ◎ |
| | Sample 10 | 7.2 | 78.2 | 3.8 | 21.5 | 26.3 | 10.9 | 0.0069 | ◎ |
| | Sample 11 | 3.6 | 48.3 | 8.8 | 18.4 | 34.9 | 13.6 | 0.0040 | ◎ |
| | Sample 12 | 6.4 | 92.9 | 3.0 | 18.1 | 24.6 | 14.5 | 0.0082 | ◎ |
| | Sample 13 | 4.4 | 34.7 | 2.3 | 13.9 | 21.1 | 8.0 | 0.0091 | ◎ |
| Comparative examples | Sample 14 | 0.1 | 1.5 | 1.0 | 0.4 | 0.4 | 12.6 | 0.0004 | X |
| | Sample 15 | 50.1 | 276.9 | 8.3 | 185.4 | 141.9 | 5.5 | 0.0172 | X |
| | Sample 16 | 0.2 | 1.2 | 1.6 | 0.8 | 0.8 | 5.6 | 0.0005 | X |
| | Sample 17 | 0.2 | 1.4 | 2.0 | 0.9 | 0.9 | 5.8 | 0.0005 | X |
| | Sample 18 | 0.3 | 1.5 | 1.9 | 0.9 | 1.0 | 5.8 | 0.0005 | X | of the glass substrates 20 in a hydrofluoric acid solution (25° C.) adjusted to a concentration of 5 wt % for a predetermined time (sample 16: approximately 17 minutes, sample 17: approximately 33 minutes, sample 18: 50 minutes). That is, the hydrofluoric acid etching was performed on the glass substrate 20 in each of samples 16 to 18.

[Measurement of Surface Roughness]

First, the surface roughness on the main surface 20a of the glass substrate 20 in each of samples 1 to 18 was measured.

The measurement of the surface roughness was performed on the main surface 20a subjected to the sand blasting process in each of samples 1 to 9, performed on the main surface 20a subjected to the wet blasting process in samples 10 to 13, performed on the main surface 20a subjected to the $SiO_2$ coating in sample 15, and performed on one main surface 20a in samples 14 and 16 to 18.

Measured parameters pertaining to the surface roughness include the arithmetical mean height Sa, the maximum pit height Sv, the mean width RSm of roughness profile element, the maximum profile peak height Rp of roughness As shown in Table 2, the arithmetical mean height Sa in the fine uneven shape was a numerical value that falls within a range of 1.4 to 10.0 nm in each of samples 1 to 13 serving as examples.

On the other hand, among samples 14 to 18 serving as comparative examples, the arithmetical mean height Sa of unprocessed sample 14 was as small as 0.1 nm, the arithmetical mean height Sa of sample 15 subjected to $SiO_2$ coating was as large as 50.1 nm, and the arithmetical mean height Sa of samples 16 to 18 subjected to the hydrofluoric acid etching was a numerical value within a range of 0.2 to 0.3 nm and was small.

As for samples 1 to 13 serving as examples, the maximum profile valley depth Rv of roughness profile element was a numerical value within a range of 9.4 to 57.5 nm, and the maximum profile peak height Rp of roughness profile element was a numerical value within a range of 5.6 to 34.2 nm, whereby the relation Rv>Rp was established for all of these samples.

On the other hand, among samples 14 to 18 serving as comparative examples, as for unprocessed sample 14, the maximum profile valley depth Rv of roughness profile element was 0.4 nm and the maximum profile peak height Rp of roughness profile element was 0.4 nm, whereby the relation Rv=Rp was established, and as for sample 15 subjected to the $SiO_2$ coating, the maximum profile valley depth Rv of roughness profile element was 141.9 nm and the maximum profile peak height Rp of roughness profile element was 185.4 nm, whereby the relation Rv<Rp was established. As for samples 16 to 18 subjected to the hydrofluoric acid etching, the maximum profile valley depth Rv of roughness profile element was a numerical value within a range of 0.8 to 1.0 nm, and the maximum profile peak height Rp of roughness profile element was a numerical value within a range of 0.8 to 0.9, whereby Rv and Rp were almost the same values.

Furthermore, Sv/Sa, which is a ratio between the maximum pit height Sv and the arithmetical mean height Sa, in the fine uneven shape, is a numerical value within a range of 8.0 to 39.0 for samples 1 to 13 serving as examples, and Sv/Sa denotes a value of 6 or more. In particular, as for samples 1 to 9 subjected to the sand blasting process, Sv/Sa, which is a ratio between the maximum pit height Sv and the arithmetical mean height Sa, in the fine uneven shape shows a value of 15 or more.

On the other hand, among samples 14 to 18 serving as comparative examples, Sv/Sa, which is a ratio between the maximum pit height Sv and the arithmetical mean height Sa, in unprocessed sample 14 was 12.6. Additionally, Sv/Sa, which is a ratio between the maximum pit height Sv and the arithmetical mean height Sa, in sample 15 subjected to the $SiO_2$ coating was 5.5 and Sv/Sa, which is a ratio between the maximum pit height Sv and the arithmetical mean height Sa, in samples 16 to 18 subjected to the hydrofluoric acid etching was a numerical value within a range of 5.6 to 5.8 nm and were small.

Furthermore, Rv/RSm, which is a ratio between the maximum profile valley depth Rv of roughness profile element and the mean width RSm of roughness profile element, in samples 1 to 13 serving as examples was a numerical value that falls within a range of 0.0040 to 0.0229.

On the other hand, among samples 14 to 18 serving as comparative examples, Rv/RSm, which is a ratio between the maximum profile valley depth Rv of roughness profile element and the mean width RSm of roughness profile element, in unprocessed sample 14 was as small as 0.0004. Rv/RSm, which is a ratio between the maximum profile valley depth Rv of roughness profile element and the mean width RSm of roughness profile element, in sample 15 subjected to the $SiO_2$ coating was 0.0172. Additionally, Rv/RSm, which is a ratio between the maximum profile valley depth Rv of roughness profile element and the mean width RSm of roughness profile element, in samples 16 to 18 subjected to the hydrofluoric acid etching was 0.0005 and was small.

[Evaluation of Writability]

The writability when characters and figures were inputted to the glass substrate 20 with the input pen 50 was evaluated through a sensory test. As an evaluation method, when a replacement refill (product name: Elastomer Nib (ACK-20004), pen tip diameter: 1.4 mm) manufactured by Wacom Co., Ltd. attached to a housing of a ballpoint pen (product name: JETSTREAM) manufactured by Mitsubishi Pencil Co., Ltd. was used as the input pen 50, and a character "a" in hiragana was written on the glass substrate 20, a case where a user intuitively felt that the writability was very good as the pen tip could be operated smoothly was evaluated as ⊙, a case where the user felt that the writability was good was evaluated as ○, and a case where the user intuitively felt that the writability was uncomfortable due to the lack of slippage or the like was evaluated as x, in order to determine the writability.

[Results of Writability Evaluation]

As shown in Table 2, as for samples 1 to 13 serving as examples, the user felt that a pen tip made of elastomer could be operated smoothly, and as a result, the writability was evaluated as ⊙. On the other hand, as for unprocessed sample 14, sample 15 subjected to the $SiO_2$ coating, and samples 16 to 18 subjected to the hydrofluoric acid etching serving as comparative examples, the user felt that a pen tip made of elastomer lacked slippage and the writability was evaluated as x.

[Overall Evaluation of Each Sample]

Based on the results mentioned above, as illustrated in Table 2, as for samples 1 to 13 serving as examples, it has been concluded that, with the appropriately fine uneven shape formed on the main surface 20a with which the pen tip 51 of the input pen 50 comes into contact, a combination of the prevention of the pen tip 51 from slipping on the main surface 20a of the glass substrate 20, and the appropriate reduction in a frictional force between the pen tip 51 and the main surface 20a contributes favorable writability.

On the other hand, in the case of unprocessed sample 14 serving as a comparative example, since the uneven shape on the main surface 20a with which the input pen 50 comes into contact were small and the pen tip 51 made of elastomer became less likely to slip, the performance of the pen was poor.

In addition, as for sample 15 subjected to the $SiO_2$ coating and samples 16 to 18 subjected to the hydrofluoric acid etching, which are comparative examples, the pen tip 51 was too difficult to slip and was caught, whereby the writability was poor.

INDUSTRIAL APPLICABILITY

The present invention is applicable to an input device cover member and an input device.

REFERENCE SIGNS LIST 10 input device
20 glass substrate (input device cover member)
20a main surface
30 display element (display)
40 digitizer circuit (detection circuit)
50 input pen 50
51 pen tip (friction element)
Rp maximum profile peak height of roughness profile element
Rv maximum profile valley depth of roughness profile element
RSm mean width of roughness profile element
Sa arithmetical mean height
Sv maximum pit height
λc high-pass filter
λc1 cutoff value of high-pass filter
λs low-pass filter
λs1 cutoff value of low-pass filter

The invention claimed is:
1. An input device cover member disposed on a front surface side of a display in an input device, wherein
   at least one main surface of the input device cover member has an uneven shape, and a maximum profile valley depth Rv of roughness profile element is larger than a maximum profile peak height Rp of roughness profile element on the main surface having the uneven shape.

2. The input device cover member according to claim 1, wherein Sv/Sa, which is a ratio between a maximum pit height Sv and an arithmetical mean height Sa, on the main surface having the uneven shape is 6 or more.

3. The input device cover member according to claim 1, wherein Sv/Sa, which is a ratio between a maximum pit height Sv and an arithmetical mean height Sa, on the main surface having the uneven shape is 15 or more.

4. The input device cover member according to claim 1, wherein Rv/RSm, which is a ratio between the maximum profile valley depth Rv of roughness profile element and a mean width RSm of roughness profile element, on the main surface having the uneven shape is 0.001 or more and 0.1 or less.

5. The input device cover member according to claim 2, wherein Rv/RSm, which is a ratio between the maximum profile valley depth Rv of the roughness profile element and a mean width RSm of the roughness profile element, on the main surface having the uneven shape is 0.001 or more and 0.1 or less.

6. An input device comprising:
the input device cover member according to claim 1;
a display; and
a detection circuit for detecting a pen input.

7. An input device comprising:
the input device cover member according to claim 2;
a display; and
a detection circuit for detecting a pen input.

8. An input device comprising:
the input device cover member according to claim 3;
a display; and
a detection circuit for detecting a pen input.

9. An input device comprising:
the input device cover member according to claim 4;
a display; and
a detection circuit for detecting a pen input.

10. The input device cover member according to claim 3, wherein Rv/RSm, which is a ratio between the maximum profile valley depth Rv of the roughness profile element and a mean width RSm of the roughness profile element, on the main surface having the uneven shape is 0.001 or more and 0.1 or less.

11. The input device cover member according to claim 1, wherein the arithmetical mean height Sa on the main surface having the uneven shape is 1 nm or more and 50 nm or less.

12. The input device cover member according to claim 2, wherein the arithmetical mean height Sa on the main surface having the uneven shape is 1 nm or more and 50 nm or less.

13. The input device cover member according to claim 3, wherein the arithmetical mean height Sa on the main surface having the uneven shape is 1 nm or more and 50 nm or less.

14. The input device cover member according to claim 4, wherein the arithmetical mean height Sa on the main surface having the uneven shape is 1 nm or more and 50 nm or less.

15. The input device cover member according to claim 5, wherein the arithmetical mean height Sa on the main surface having the uneven shape is 1 nm or more and 50 nm or less.

16. The input device according to claim 6 further comprising an input pen for performing the pen input to the input device by moving while making contact with a main surface of the input device cover member.

17. The input device according to claim 7 further comprising an input pen for performing the pen input to the input device by moving while making contact with a main surface of the input device cover member.

18. The input device according to claim 8 further comprising an input pen for performing the pen input to the input device by moving while making contact with a main surface of the input device cover member.

19. The input device according to claim 9 further comprising an input pen for performing the pen input to the input device by moving while making contact with a main surface of the input device cover member.

* * * * *